April 4, 1944.     N. KAPLAN     2,345,607
FISH SCRAPER
Filed April 13, 1942     6 Sheets-Sheet 2
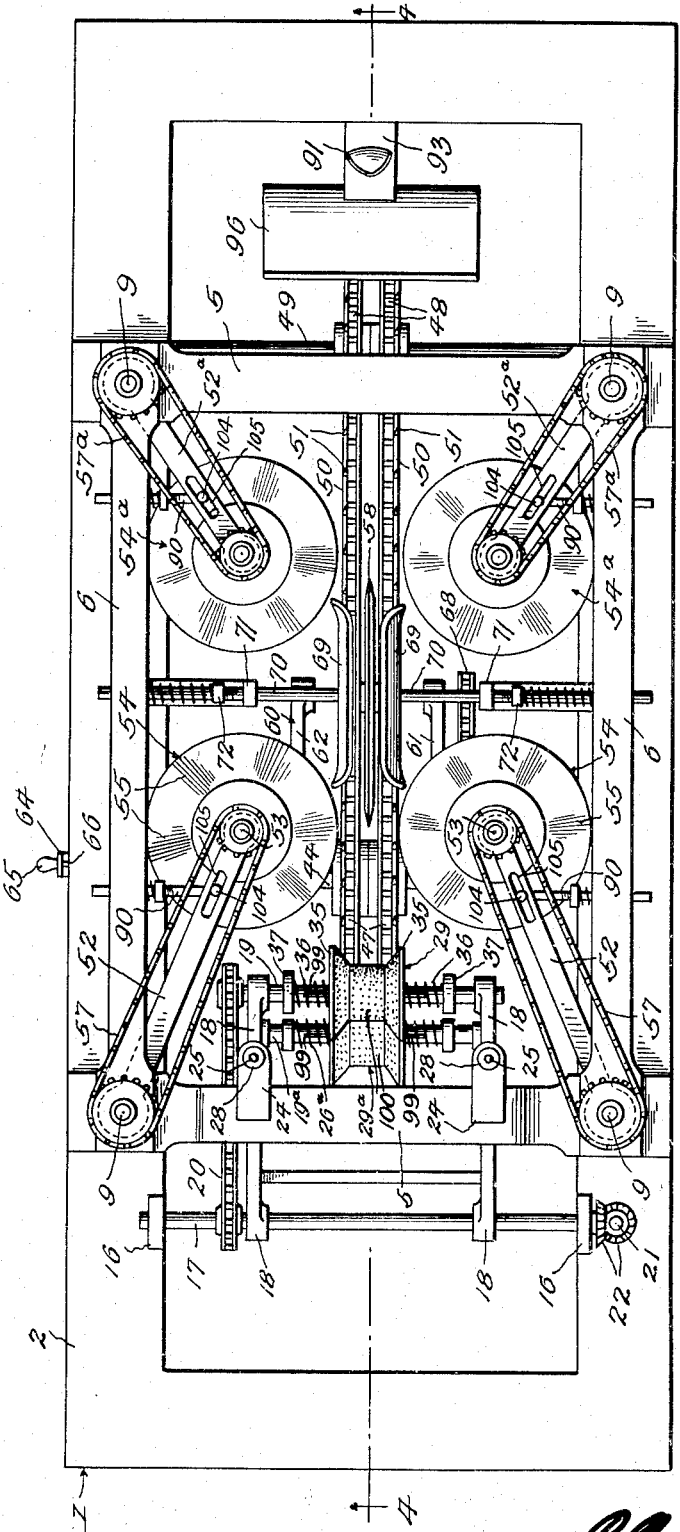
N. Kaplan,
INVENTOR.
BY *CASnowLeo.*
ATTORNEY

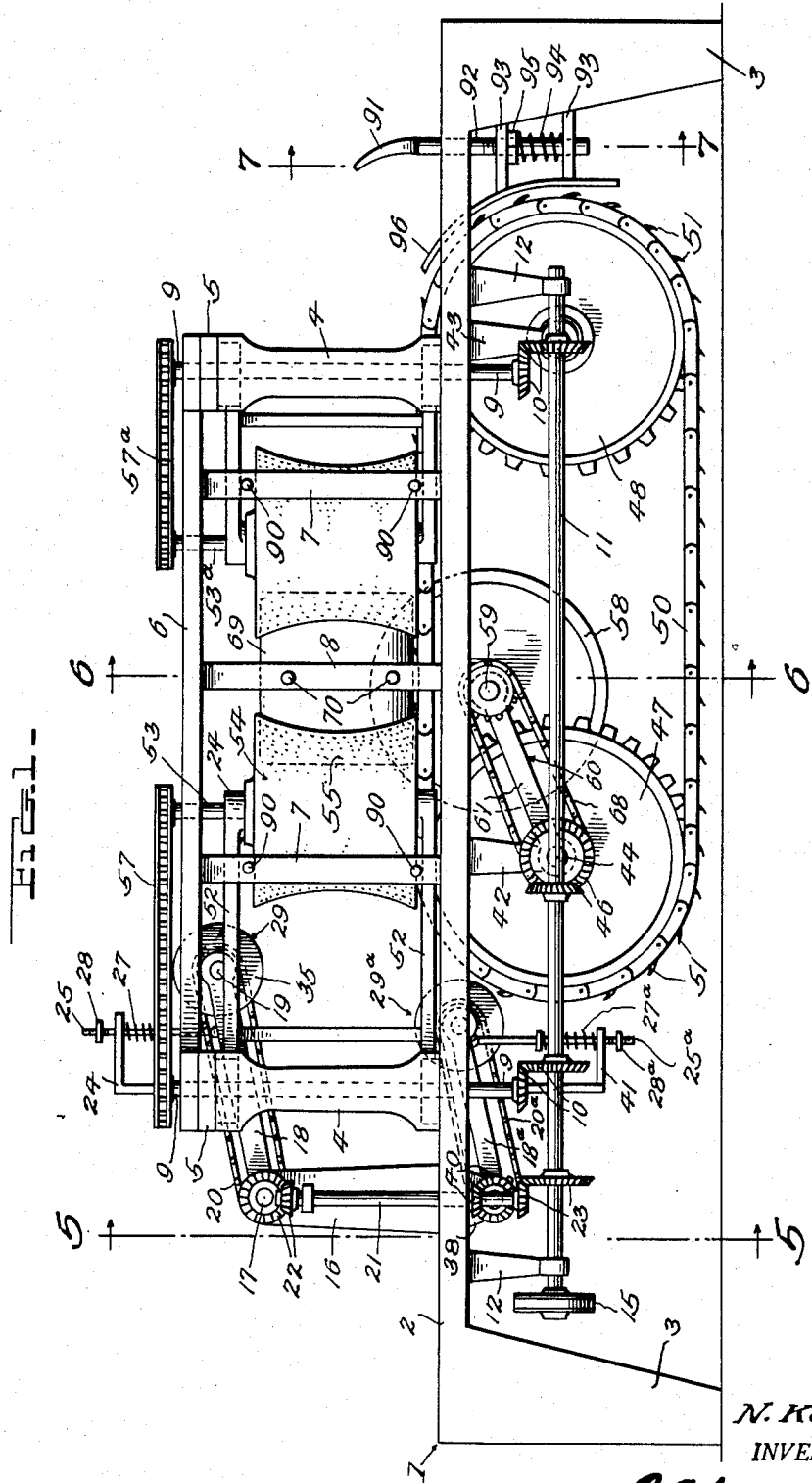

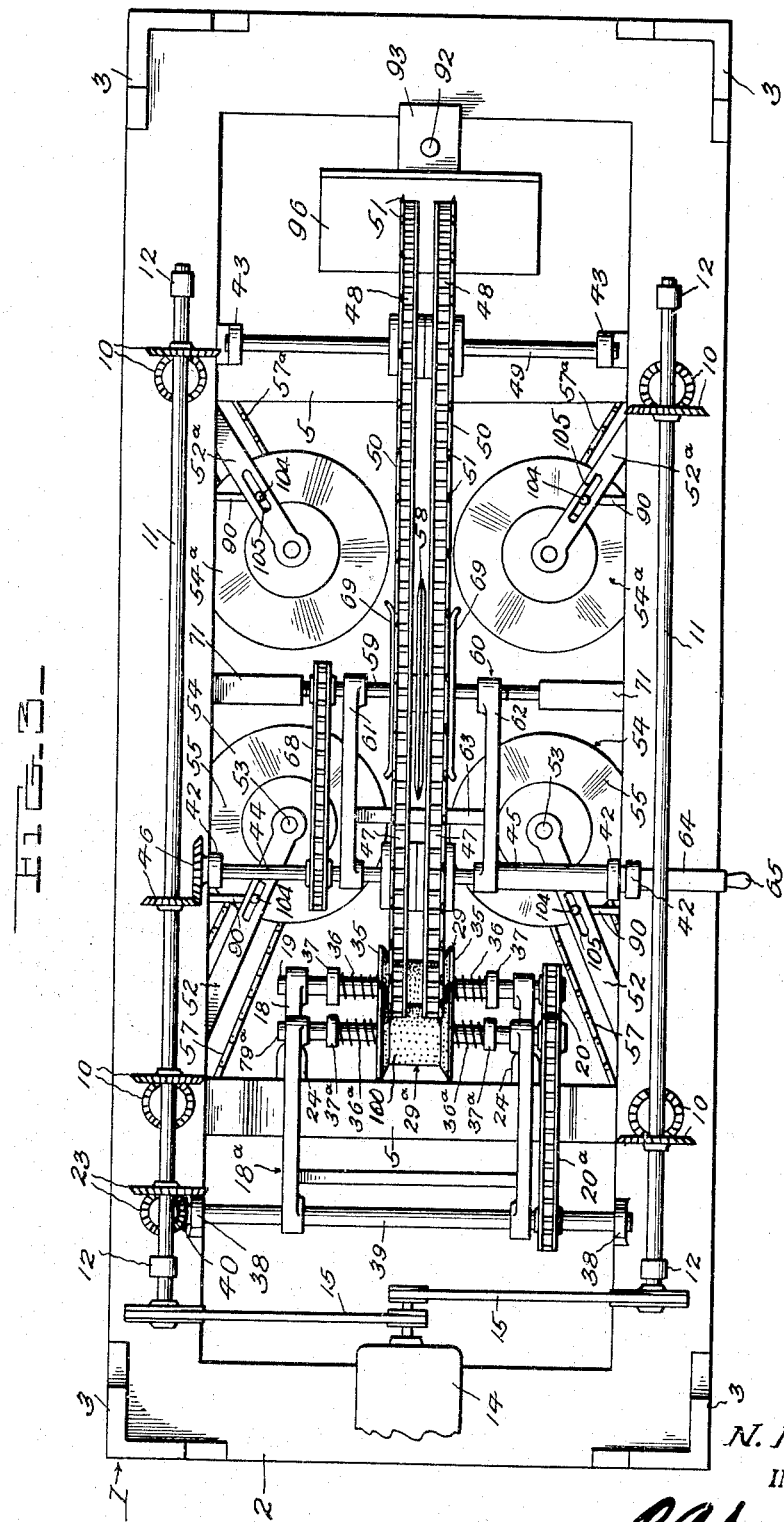

April 4, 1944.  N. KAPLAN  2,345,607
FISH SCRAPER
Filed April 13, 1942  6 Sheets-Sheet 4
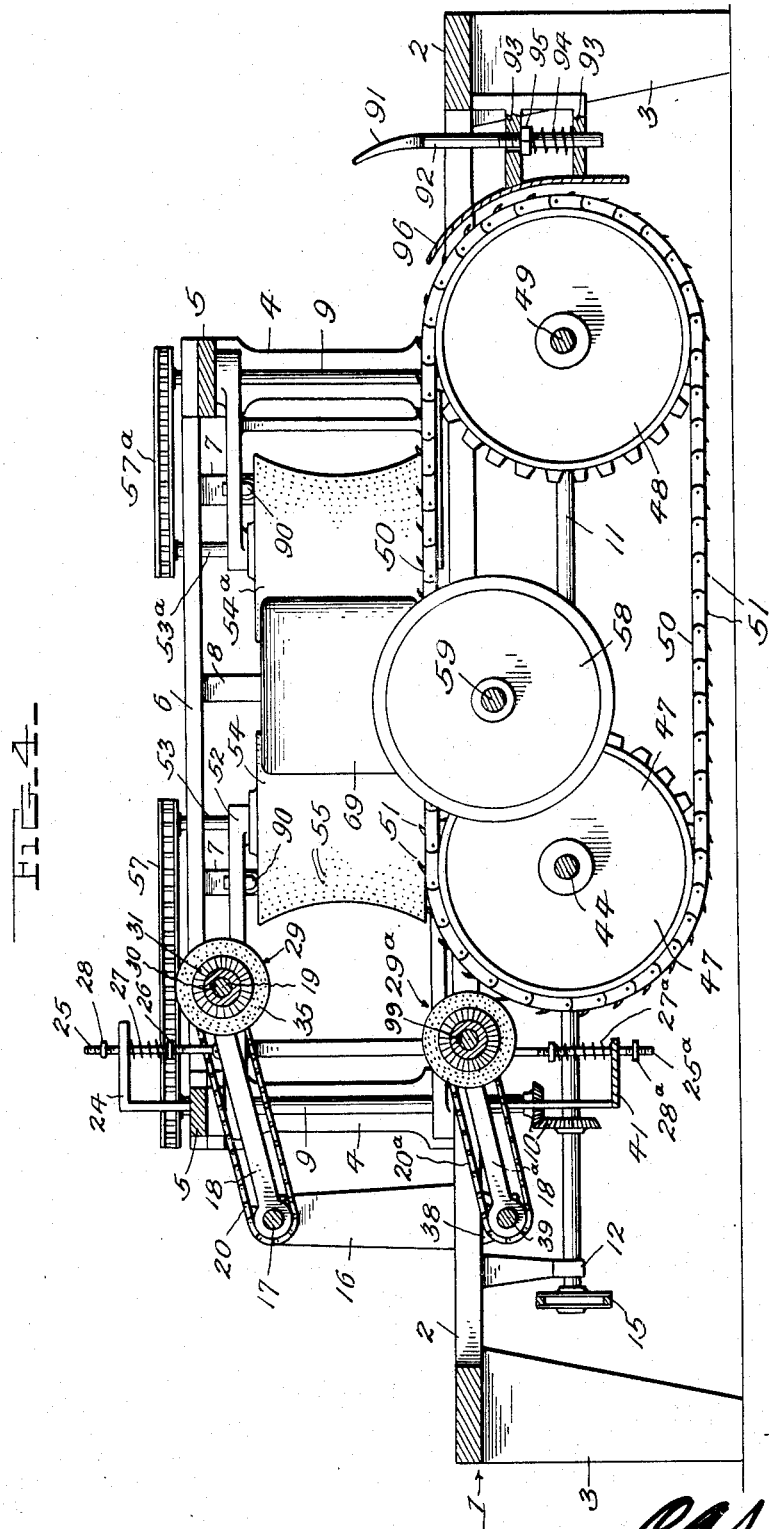
N. Kaplan,
INVENTOR.
BY *Anowles*
ATTORNEY April 4, 1944.   N. KAPLAN   2,345,607
FISH SCRAPER
Filed April 13, 1942   6 Sheets-Sheet 5
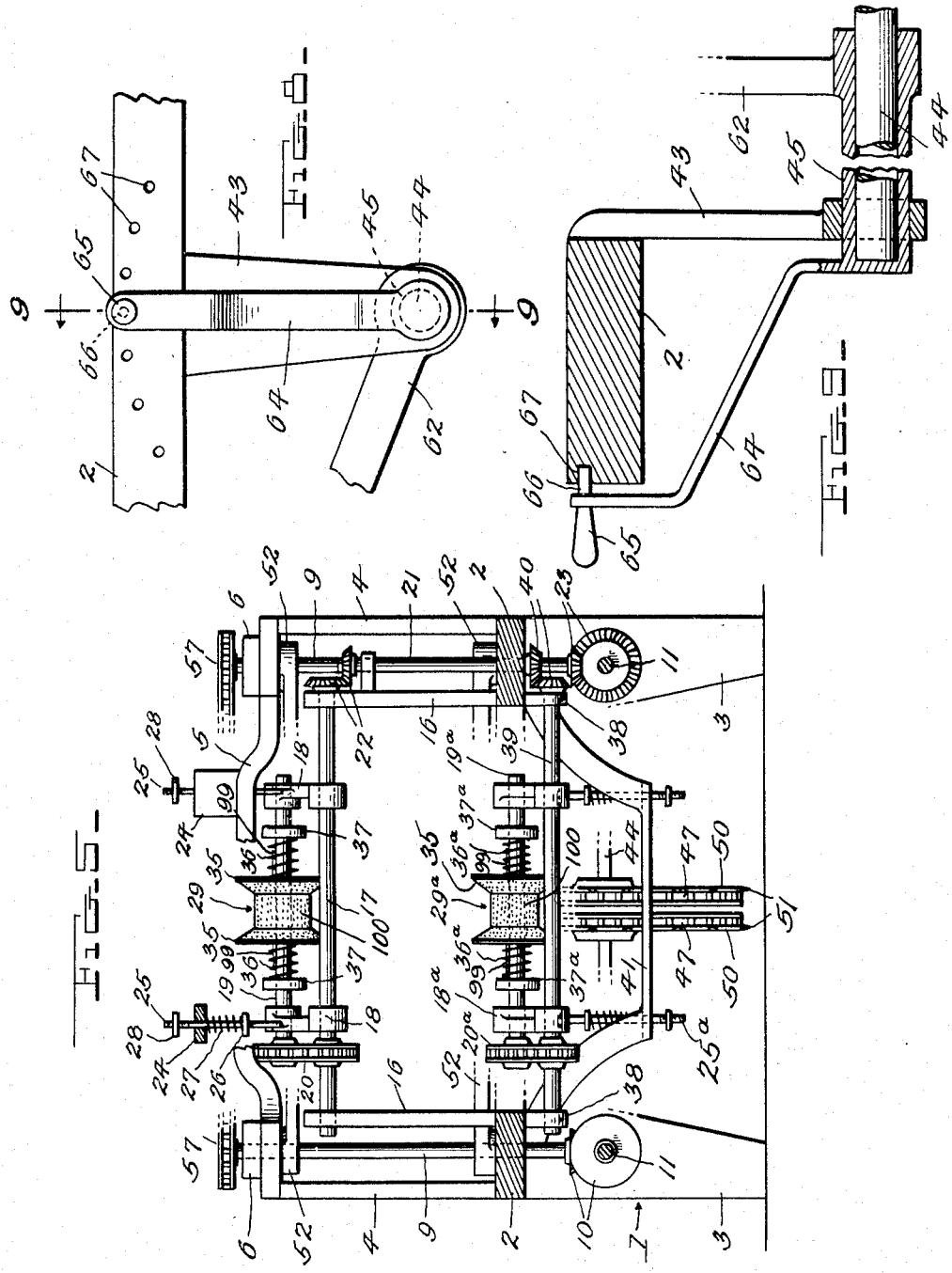
N. Kaplan,
INVENTOR.
BY *Knowles,*
ATTORNEY April 4, 1944.  N. KAPLAN  2,345,607
FISH SCRAPER
Filed April 13, 1942  6 Sheets-Sheet 6
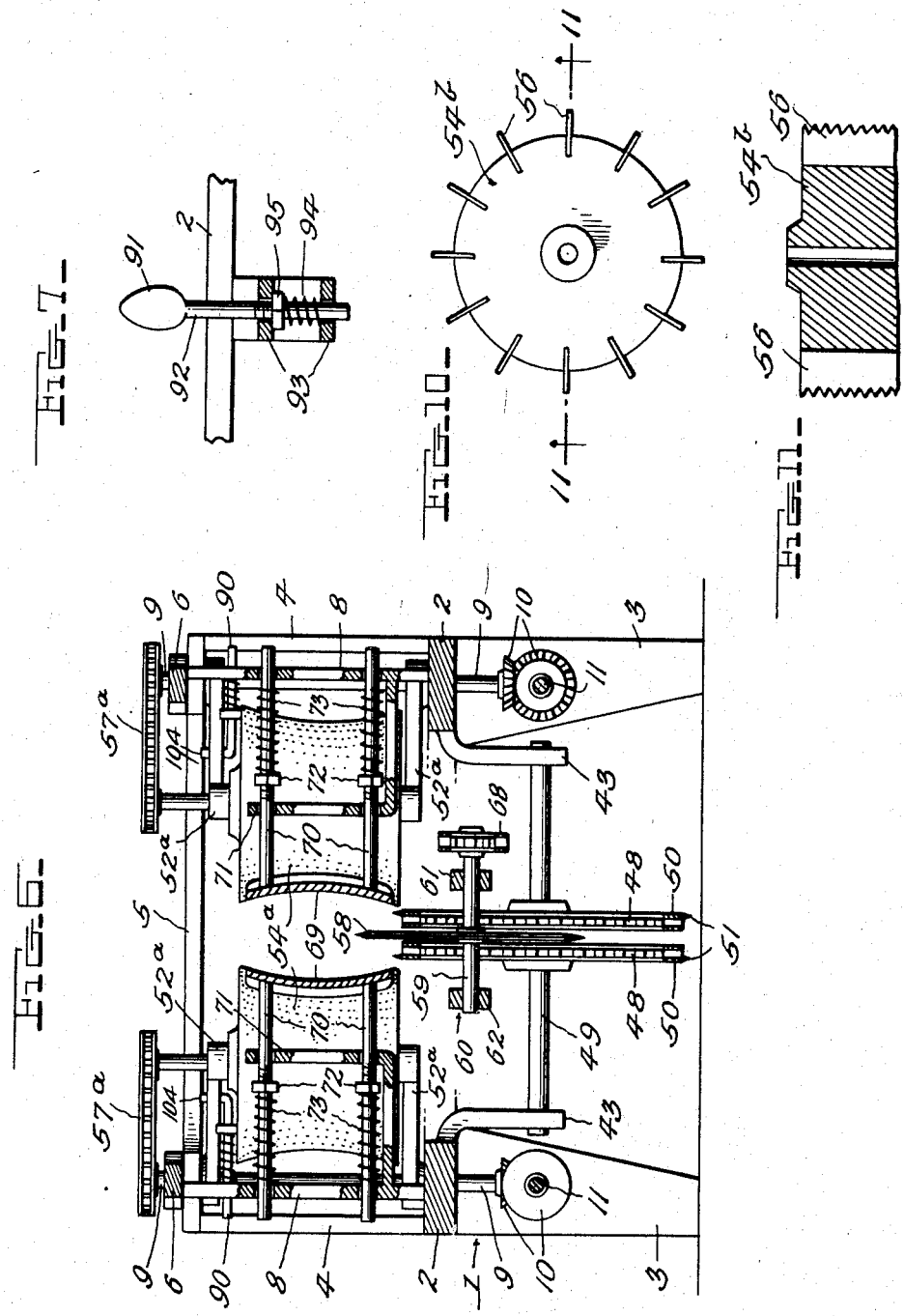
N. Kaplan,
INVENTOR.
BY
ATTORNEY Patented Apr. 4, 1944

2,345,607

UNITED STATES PATENT OFFICE 2,345,607

FISH SCRAPER

Nathan Kaplan, Atlanta, Ga.

Application April 13, 1942, Serial No. 438,832

13 Claims. (Cl. 17—3)

The device forming the subject matter of this application is a machine used for cleaning fish. The invention aims to provide novel means for removing the scales from the upper and lower edges of the body of the fish, provide novel means for cleaning the sides of the fish, and to provide novel means for slitting the fish along the belly, so that the entrails may be removed. The invention has, as another of its objects, the provision of novel means for removing the entrails. Novel driving connections and adjustments are provided, and the invention, in general, aims to supply a strong, simple and compact machine, which will carry out a fish cleaning operation with a minimum amount of expert attention.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in side elevation, a cleaning machine constructed in accordance with the invention;

Fig. 2 is a top plan;

Fig. 3 is a bottom plan;

Fig. 4 is a section on the line 4—4 of Fig. 2;

Fig. 5 is a section on the line 5—5 of Fig. 1;

Fig. 6 is a section on the line 6—6 of Fig. 1;

Fig. 7 is a section on the line 7—7 of Fig. 1;

Fig. 8 is a side elevation showing a portion of the mechanism whereby the cutter or slitter may be raised and lowered;

Fig. 9 is a section on the line 9—9 of Fig. 8;

Fig. 10 is an end elevation showing a modified cleaning brush;

Fig. 11 is a section on the line 11—11 of Fig. 10.

The fish cleaning machine which forms the subject matter of this application comprises a support, including a bench 1, made up of an open frame 2 and legs 3. Posts 4 are erected on the frame 2, the posts at opposite sides of the frame being connected by tie bars 5, and the tie bars being connected at their ends by longitudinal tie bars 6.

It appears in Fig. 1 that the longitudinal tie bars 6 are connected to the frame 2 of the bench 1 by outer standards 7 and an intermediate standard 8.

Vertical shafts 9 are mounted for rotation in the frame 2 and in the end portions of the ties 5 and 6. Referring to Fig. 6, for instance, it will be seen that the shafts 9 are connected by beveled gears 10 to horizontal shafts 11 (Figs. 1 and 3) disposed longitudinally of the machine and journaled in depending hangers 12 on the bench frame 2.

A motor 14 (Fig. 3) is supported on the bench 1, or otherwise, and the shaft of the motor is connected by belt and pulley drives 15 to the longitudinal shafts 11.

Bearing posts 16 (Fig. 4) are mounted on the part 2 of the bench 1, a transverse shaft 17 (Fig. 3) being mounted to rotate in the posts. An upper radius frame 18 is mounted to swing vertically on the shaft 17. A transverse shaft 19 is mounted to rotate in the inner end of the upper radius frame 18.

The shaft 19 derives rotation from the shaft 17 by way of a chain and sprocket drive 20, disposed outside the radius frame 18. As shown in Fig. 5, and in Fig. 1, a vertical shaft 21 is supported for rotation on one of the bearing posts 16, and is operatively connected with the shaft 17 by beveled gears 22. The shaft 21 is connected operatively with one of the shafts 11 by beveled gears 23.

Angle brackets 24 are mounted on the tie 5 which is at the forward end of the machine, and in the angle brackets, plunger rods 25 are mounted to move vertically, the lower ends of the plunger rods being pivoted to the side arms of the upper radius frame 18. The plunger rods carry abutments 26, disposed below the angle brackets 24, compression springs 27 being mounted on the rods, between the angle brackets and the abutments. Nuts 28 are threaded on the upper portions of the plunger rods, and, coacting with the angle brackets 24, limit the downward movement of the plunger rods and of the radius frame 18.

A spool 29 is provided, and includes a tubular sleeve 30 receiving the shaft 19. The concavity of the spool 29 carries a means for removing the scales from the upper edge of a body of a fish. That means may be bristles 31, preferably made of resilient metal, and indicated diagrammatically in the drawings, to the end that they may not obscure other parts. The spool comprises a central body 100, and end pieces 35. The body 100 is secured to the shaft 19, but the end pieces 35 are splined at 99 to the shaft 19, for rotation therewith, and for sliding movement therealong, to accommodate fish of larger than a minimum size, the end pieces being carried inwardly to the position of Fig. 3 by means of compression springs 36, mounted on the shaft 19 between abutments 37 on the shaft and the end pieces of the spool.

Referring to Figs. 1, 3 and 5, hangers 38 are mounted on the side members of the frame 2 of the bench 1, and in them a transverse shaft 39 is journaled. The shaft 39 is driven from the shaft 21 by intermeshing beveled gears 40, shown best in Fig. 5, and the shaft 39 corresponds in function to the shaft 17.

The shaft 39 carries a mechanism for removing the scales from the lower edge of the body of a fish, and that mechanism resembles so closely the one already described, and used for removing the scales from the upper edge of the body of the fish, that parts hereinbefore described are designated by numerals already used, with the suffix *a*. The elevating plunger for the radius frame 18*a* is carried slidably in a depressed cross piece 41 (Fig. 5), supported by the side members of the bench frame 2.

As thus far described, the machine includes a means for removing scales from the upper and lower edges of the body of a fish. The description will be suspended at this point to point out the operation of the device as hereinbefore set forth.

As to the drives, and referring to Fig. 3, the motor 14 and the belt and pulley parts 15 rotate the longitudinal shafts 11. Noting Fig. 5, together with Fig. 1, the vertical shaft 21 is driven by the beveled pinions 23. The beveled pinions 22 rotate the shaft 17, and from the shaft 17 motion is transmitted to the shaft 19 by means of the chain and sprocket drive 20, and the brush 29 is rotated. The springs 27 and the plunger rods 25 swing the radius frame 18 downwardly and cause the spools 29 to remove the scales from the upper edge of the body of the fish. Since the end pieces 35 of the spool 29 are pressed inwardly by the springs 36, they can yield outwardly, to accommodate a fish that runs a trifle oversize.

Noting the shaft 39 of Fig. 4 and the parts designated by characters including the suffix *a*, the operation of the mechanism that cleans the lower edge of the fish will be understood readily, since in all substantial respects it duplicates the operation of the mechanism which cleans the upper edge of the fish.

The next step comprises advancing the fish to a first instrumentality for removing the side scales.

As to the means for advancing the fish as aforesaid, forward hangers 42 and rear hangers 43 (Fig. 3) are carried by the side members 2 of the bench 1. A transverse shaft 44 is journaled in the forward hangers 42. Referring to Fig. 9, the opposite end of the shaft 44 is mounted to rotate in a sleeve 45. The sleeve 45 can be rotated at the will of an operator, for a purpose to be described hereinafter, in the adjacent hanger 43, but at this point of the description, the sleeve may be regarded as fixed.

The shaft 44 receives rotation from the shaft 11, by intermeshing beveled gears 46, appearing clearly in Fig. 1. Sprocket wheels 47 (Fig. 4) are secured to the shaft 44. Sprocket wheels 48 are secured to a shaft 49 which is journaled in the rear hangers 43 (Fig. 3). The sprocket wheels 47 and 48 are engaged by endless sprocket chain conveyors 50, located closely enough together to support a fish, the sprocket chains being provided with fish-engaging claws 51, which, as to the upper runs of the sprocket chains, have a rearward inclination. The fish to be cleaned is carried rearwardly on the chains 50.

The scales are removed from the sides of the fish by means of a forward scaling instrumentality and a rear scaling instrumentality.

As to the forward scaling instrumentality, carrier frames 52 are mounted to swing horizontally on the shafts 9, between the frame 2 of the bench 1 and the tie bars 5. In the rear ends of the carrier frames 52, vertical shafts 53 are rotatably mounted. The carrier frames 52 have an inward and rearward inclination.

Rotary cleaning members or brushes 54 are secured to the shafts 53 and are concaved to accommodate themselves to the sides of the fish to be cleaned. The rotary brushes 54 may have bristles 55 which are resilient and made of metal, the bristles being indicated diagrammatically. If preferred, the cleaning members 54*b* of Figs. 10 and 11 may be used, toothed metal plates 56 replacing the bristles 55. The shafts 53 are operated from the forward shafts 9 by chain and sprocket drives 57.

As the fish is passing between the cleaning members 54, it is slit longitudinally, along the belly, by a rotatable cutter 58, appearing to advantage in Figs. 3 and 4. The cutter 58 operates between the chains 50 and extends slightly above them, the cutter being mounted on a horizontal shaft 59. The numeral 60 (Fig. 3) marks a frame, made up of arms 61 and 62, joined by a cross piece 63. The arm 61 is mounted to swing vertically on the shaft 44, but the arm 62 is fixed to the sleeve 45, shown in Figs. 8 and 9. The sleeve 45 is provided at its outer end with an arm 64 that has some resiliency inwardly and outwardly, the arm carrying a hand grip 65, terminating in a pin 66, adapted to be received in any one of a plurality of seats 67, formed in an arc and located in the edge of the bench frame 2.

The frame 60 can be swung vertically by way of the handle 65, the arm 64 and the sleeve 45, thereby to raise or lower the cutter 58, the cutter, therefore, being vertically adjustable to accommodate itself to the size of the fish and to the thickness of the belly wall. The shaft 59 is driven from the shaft 44 by means of a chain and sprocket connection 68.

Whilst the fish is being slit by the cutter 58, it is held against sidewise movement by oppositely disposed guide plates 69. The guide plates 69 are so mounted that they will be forced outwardly in opposite directions by an oversize fish passing between them. It is shown in Fig. 6 that the guide plates 69 are outwardly concaved on their inner surfaces, to fit the fish. The guide plates 69 are secured to the inner ends of slide rods 70, mounted for reciprocation in the intermediate standards 8, and in an inwardly offset bracket 71 carried by each standard. Adjusting nuts 72 are mounted on the slide rods 70, compression springs 73 being mounted on the rods, between the nuts and the standards 8.

The structure last above described affords a means whereby the guide plates 69 can yield outwardly to accommodate an oversized fish, and be returned automatically, by the springs 73, to the position shown in Fig. 6.

As the fish, supported by the chains 50, is leaving the cutter or slitter 58, the fish is given a second cleaning, at the sides, by the rear cleaning instrumentality hereinbefore referred to. The rear cleaning mechanism is a substantial duplicate of the forward cleaning mechanism, and, therefore, numerals hereinbefore employed have been used, with the suffix e in connection with the rear cleaning mechanism. The frames 52a of the rear cleaning mechanism (Fig. 3) have an inward and forward inclination.

Spring-pressed rods 90, constructed similar to the rods 70 of Fig. 6, are mounted for longitudinal sliding movement on the standards 7, and have upturned ends 104 (Fig. 6), received in slots 105, formed in the upper portions of the frames 52 and 52a. The brushes 54a and 54 are held against the sides of the fish, and the brushes 54a—54a and 54—54 are permitted to move to and from each other, according to the size of the fish.

Noting Figs. 4 and 7, vertically spaced guides 93 are supported from the rear end portion of the bench frame 2, and in them, the stem 92 of a spoon-like eviscerator 91 is mounted for vertical movement. An adjusting nut 95 is threaded on the stem 92 and serves as a stop which, engaging the uppermost guide, limits the upward movement of the eviscerator 91. A spring 94 surrounds a portion of the stem 92 and bears against the lowermost guide 93 and against the nut 95. The eviscerator 91 can yield downwardly, to cooperate with fish of different sizes.

An arcuate shield 96 is secured to the forward ends of the guides 93. The shield overhangs so much of the conveyor chains 50 as is engaged about the sprocket wheels 48 of Fig. 1.

As the sprocket chains 50 carry the fish rearwardly, the shield 96 prevents the entrails from fouling the rear portions of the sprocket wheels 48 and so much of the sprocket chains as may be engaged therewith.

The fish passes rearwardly over the eviscerator 91, and the entrails are removed, the entrails dropping downwardly to any suitable receptacle (not shown) provided for their reception.

The operation of the machine has been set forth hereinbefore, step by step, in connection with the various component mechanisms, but a brief recapitulation may be in order at this point.

Referring to Fig. 1, when the fish is advanced by the conveyor chains 50, the brush 29 cleans the upper edge of the fish, and the brush 29a cleans the lower edge of the fish. The fish is advanced between the cleaning members 54 and the side scales are removed to a considerable degree.

The fish is slit along the belly by the rotary knife 58 of Fig. 1, the fish being retained, during that operation, by the guides plates 69 of Fig. 2. The fish is given further side-cleaning by the members 54a of Fig. 2.

Ultimately, the fish moves over the eviscerator 91, and the cleaning operation is completed.

Having thus described the invention, what is claimed is:

1. In a fish cleaning machine, a support, pairs of frames and means for mounting the frames on the support for horizontal swinging movement, means for yieldably resisting the outward swinging movement of the frames, side cleaners journaled on the frames for rotation each about a vertical axis, means for rotating the side cleaners, a belly slitter mounted for rotation on the support, means for rotating the slitter, elongated guides mounted on the support and located on opposite sides of the slitter, the frames of one pair slanting inwardly and rearwardly, and the frames of the other pair slanting inwardly and forwardly, thereby to shorten the machine and to bring the side cleaners of both pairs into overlapped relation to the ends of the guides and with respect to diametrically opposite portions of the slitter, fish cleaning means on the frame, and mechanism for advancing a fish with respect to the cleaning means, the guides, and the slitter.

2. In a fish cleaning machine, a support, a fish cleaning means carried by the support, a belly slitter carried by the support, mechanism for advancing a fish with respect to the cleaning means and the belly slitter, said mechanism comprising a sprocket wheel carried for rotation on the support and a conveyor chain engaged with the sprocket wheel, a guide carried by the frame and located to the rear of the sprocket wheel, an eviscerator mounted on the guide for up and down movement, and located in line with the slitter, means for holding the eviscerator yieldably in an elevated position, and a shield carried by the guide and extended over the sprocket wheel, substantially to the uppermost portion thereof, to minimize the fouling of the chain and the sprocket wheel, by entrails, as a fish moves from the conveyor to the eviscerator, under the impulse of the conveyor.

3. In a fish cleaning machine spaced parallel endless conveyors positioned to extend under and engage and support the belly of a fish at opposite sides of the center thereof, a rotary cutter extending between the conveyors and position to slit the supported fish along the center of the belly thereof, thereby to open the fish for downward drainage, an eviscerator positioned to be straddled by the slit bottom portion of the fish during the movement of the fish with the conveyors, rotary brushes positioned to clean the outer surfaces of the fish while moving with the conveyors, a motor, and separate means operated by the motor for simultaneously actuating the conveyors, the slitting means and the brushes.

4. In a machine for cleaning fish spaced parallel endless conveyors positioned to extend under and support a fish at opposite sides of the center of its belly and with the belly lowermost, a rotary belly slitting element extending upwardly between the conveyors and in position to engage the belly of the fish along the center thereof thereby to open the fish downwardly for drainage between the conveyors, opposed pairs of scale removing brushes positioned to engage the respective sides of the fish while traveling with the conveyors, separate means for pressing the brushes independently toward the sides of the fish thereby to yieldingly engage the fish while traveling therebetween, yieldingly pressed parallel guide members above the respective conveyors and bridging the gaps between the brushes, said members constituting guides for the fish while traveling with its belly lowermost between the brushes, and means for simultaneously actuating the slitting element and brushes.

5. In a machine for cleaning fish spaced parallel endless conveyors positioned to extend under and support a fish at opposite sides of the center of its belly and with the belly lowermost, a rotary belly slitting element extending upwardly between the conveyors and in position to engage the belly of the fish along the center thereof thereby to open the fish downwardly for drainage between the conveyors, opposed pairs of scale removing brushes positioned to engage the respective sides of the fish while traveling with the conveyors, separate means for pressing the brushes independently toward the sides of the fish thereby to yieldingly engage the fish while traveling therebetween, yieldingly pressed parallel guide members above the respective conveyors and bridging the gaps between the brushes, said members constituting guides for the fish while traveling with its belly lowermost between the brushes, upper and lower brushes mounted for rotation about axes extending across the path of movement of the fish and positioned to scrub the belly and back of the fish before the fish reaches the slitting element, and means for simultaneously rotating the slitting element and all of the brushes.

6. A machine for cleaning fish including laterally spaced parallel endless conveyors positioned to extend under and support the belly portion of a fish on opposite sides of the center line of the belly, rotary slitting means extending between the conveyors and upwardly into the path of the fish, thereby to slit the fish along its belly, opposed yieldingly restrained guides positioned to support a fish with its sides in wiping engagement with the guides, the slitting means being extended between the guides, whereby the fish is held centered during the slitting operation, rotary brushes positioned to engage and clean the sides of the fish while traveling with the conveyors, and lower and upper transversely extended brushes positioned to engage the back and belly portions of the fish.

7. A machine for cleaning fish including laterally spaced parallel endless conveyors positioned to extend under and support the belly portion of a fish on opposite sides of the center line of the belly, rotary slitting means extending between the conveyors and upwardly into the path of the fish, opposed yieldingly restrained guides positioned to support a fish with its sides in wiping engagement with the guides, the slitting means being extended between the guides, whereby the fish is held centered during the slitting operation, rotary brushes positioned to engage and clean the sides of the fish while traveling with the conveyors, lower and upper transversely extended brushes positioned to engage the back and belly portions of the fish, means for simultaneously rotating the brushes and the slitting means, and an eviscerator extending upwardly in a vertical plane passing between the conveyors and positioned to be straddled by the slit belly of the fish after leaving the brushes.

8. A machine for cleaning fish including laterally spaced longitudinally movable endless conveyors positioned to extend under and support the belly portion of a fish at opposite sides of the center line thereof, a rotary slitting element extending between the conveyors and in position to slit the fish along the center line of its belly thereby to open the fish downwardly for drainage between the conveyors, opposed yieldingly restrained guides for wiping engagement by the respective sides of the supported fish, said slitting element being extended between the guides whereby the fish is held centered during the slitting operation, and an eviscerator positioned to extend upwardly into the slit belly of the fish during the movement of the fish with the conveyors, said eviscerator being extended above the conveyors and in a vertical plane passing between them.

9. A machine for cleaning fish including laterally spaced endless parallel conveyors positioned to extend under and support the belly portion of a fish at opposite sides of the center line thereof, yieldingly restrained means positioned for wiping engagement by the respective sides of the supported fish, a rotary slitting element extended between said means, for slitting the belly of a fish upwardly and longitudinally along the center line thereof to open the fish for downward drainage between the conveyors, upper and lower transversely extended rotary brushes for straddling and cleaning the back and belly portions respectively of the fish, each of said brushes including end portions shiftable axially relatively to each other for engagement with fish of different thicknesses, and yielding means for restraining the relative movement of said portions of the brushes.

10. A fish cleaning machine constructed as set forth in claim 4, in combination with an eviscerator positioned to be straddled by the downwardly-opened portion of the fish during the movement of the fish with the conveyors.

11. A fish cleaning machine constructed as set forth in claim 5, in combination with an eviscerator positioned to be straddled by the downwardly-opened portion of the fish during the movement of the fish with the conveyors.

12. A fish cleaning machine constructed as set forth in claim 6, in combination with an eviscerator positioned to enter the slit belly of the fish during the movement of the fish with the conveyors.

13. A fish cleaning machine constructed as set forth in claim 9, in combination with an eviscerator positioned to enter the slit belly of the fish during the movement of the fish with the conveyors.

NATHAN KAPLAN.